(12) United States Patent
Timperley

(10) Patent No.: US 8,357,042 B2
(45) Date of Patent: Jan. 22, 2013

(54) GAMING SYSTEM, A SOUND CONTROLLER, AND A METHOD OF GAMING

(75) Inventor: David Keith Timperley, Randwick (AU)

(73) Assignee: Aristocrat Technologies Australia PTY Limited (AU)

( * ) Notice: Subject to any disclaimer, the term of this patent is extended or adjusted under 35 U.S.C. 154(b) by 944 days.

(21) Appl. No.: 12/340,707

(22) Filed: Dec. 20, 2008

(65) Prior Publication Data

US 2009/0264181 A1 Oct. 22, 2009

(30) Foreign Application Priority Data

Dec. 21, 2007 (AU) .................................. 2007907054
Apr. 16, 2008 (AU) .................................. 2008901891

(51) Int. Cl.
*G06F 19/00* (2006.01)
*A63F 13/12* (2006.01)

(52) U.S. Cl. ......................................................... 463/35
(58) Field of Classification Search ...................... 463/35
See application file for complete search history.

(56) References Cited

U.S. PATENT DOCUMENTS

| | | | |
|---|---|---|---|
| 5,054,787 A | 10/1991 | Richardson | |
| 5,788,241 A | 8/1998 | Ung | |
| 5,971,271 A | 10/1999 | Wynn | |
| 7,105,736 B2 * | 9/2006 | Laakso ............................ | 84/615 |
| 2002/0016201 A1 | 2/2002 | Bennett et al. | |
| 2002/0107067 A1 | 8/2002 | McGlone et al. | |
| 2003/0073491 A1 | 4/2003 | Hecht et al. | |
| 2005/0043092 A1 | 2/2005 | Gauselmann | |
| 2005/0159218 A1 | 7/2005 | Blanco | |
| 2005/0164785 A1 | 7/2005 | Connelly | |
| 2005/0164786 A1 | 7/2005 | Connelly | |
| 2006/0046829 A1 | 3/2006 | White | |
| 2006/0199635 A1 | 9/2006 | Radek | |
| 2006/0217172 A1 | 9/2006 | Roireau | |
| 2006/0247007 A1 | 11/2006 | Inamura | |
| 2006/0258422 A1 | 11/2006 | Walker et al. | |
| 2006/0287037 A1 | 12/2006 | Thomas | |
| 2007/0015570 A1 | 1/2007 | Pryzby | |
| 2007/0105610 A1 | 5/2007 | Anderson | |
| 2007/0123335 A1 | 5/2007 | Okada | |

FOREIGN PATENT DOCUMENTS

| | | |
|---|---|---|
| DE | 19542625 A1 | 2/1997 |
| EP | 1477210 A2 | 11/2004 |
| GB | 1274249 | 5/1972 |
| GB | 2430332 | 3/2007 |
| JP | 2004081528 A | 3/2004 |
| JP | 2004180917 A | 7/2004 |
| NZ | 510747 | 4/2003 |
| WO | 2004025583 | 3/2004 |
| WO | 2005114598 | 12/2005 |
| WO | 2005114599 | 12/2005 |
| WO | 2006017445 | 2/2006 |
| WO | 2006125013 | 11/2006 |
| WO | 2007055949 | 5/2007 |
| WO | 2007117418 | 10/2007 |

* cited by examiner

*Primary Examiner* — Evan Pert
(74) *Attorney, Agent, or Firm* — McAndrews, Held & Malloy, Ltd.

(57) ABSTRACT

A method of gaming comprising: outputting a plurality of different game accompanying sounds individually during at least part of play of one or more games; and outputting two or more sounds together in response to at least one game event occurring.

22 Claims, 4 Drawing Sheets

GAMING SYSTEM, A SOUND CONTROLLER, AND A METHOD OF GAMING

RELATED APPLICATIONS

This application claims priority to Australian Provisional Patent Application No. 2007907054, having a filing date of Dec. 21, 2007, and to Australian Provisional Patent Application No. 2008901891, having a filing date of Apr. 16, 2008, both of which are incorporated herein by reference in their entirety.

FIELD

The invention relates to a gaming system, a sound controller, and a method of gaming.

BACKGROUND

Existing gaming machines employ sound effects to enhance the enjoyment of players playing gaming machines. While such gaming systems provide users with enjoyment, a need exists for alternative gaming systems in order to maintain or increase player enjoyment.

SUMMARY OF THE INVENTION

In a first aspect, the invention provides a method of gaming comprising:

outputting a plurality of different game accompanying sounds individually during at least part of play of one or more games; and outputting two or more sounds together in response to at least one game event occurring.

In an embodiment, wherein different game accompanying sounds are output by respective ones of a plurality of gaming devices, and the sounds are all output together as a composite output sound by at least one of the gaming devices in response to the at least one game event occurring.

In an embodiment, the composite output sound is output by each gaming device associated with the game event.

In an embodiment, the composite output sound is output by one gaming device.

In an embodiment, the individual sounds are associated with respective ones of a plurality of game events which can occur on at least one gaming device.

In an embodiment, the method comprises outputting a composite sound formed from sounds associated with game events which occur together.

In an embodiment, individual sounds are associated with respective ones of a plurality of symbols and each game event involves the symbols being displayed on a display.

In an embodiment, each game event involves the symbols forming part of a winning combination.

In an embodiment, all the sounds are output together when all of the symbols form a winning combination.

In an embodiment, the game event is a win in at least one of the games.

In a second aspect, the invention provides a gaming system comprising:

at least one gaming device associated with at least one speaker; and at least one sound controller arranged to control the at least one speaker to output a plurality of different game accompanying sounds individually during at least part of play of one or more games and to output two or more sounds together in response to at least one game event occurring.

In an embodiment, the gaming system comprises a plurality of gaming devices each associated with at least one speaker, and wherein the sound controller is arranged to control the sound output such that different game accompanying sounds are output by speakers of respective ones of the plurality of gaming devices, and the sounds are all output together as a composite output sound by at least one of the gaming devices in response to the at least one game event occurring.

In an embodiment, the sound controller controls the sound output such that the composite output sound is output by the at least one speaker associated with each gaming device associated with the game event.

In an embodiment, the sound controller controls the sound output so that the composite output sound is output by the speakers associated with one gaming device.

In an embodiment, the individual sounds are associated with respective ones of a plurality of game events which can occur on at least one gaming device.

In an embodiment, the sound controller is arranged to control the at least one speaker to output a composite sound formed from sounds associated with game events which occur together.

In an embodiment, individual sounds are associated with respective ones of a plurality of symbols and each game event involves the symbols being displayed on a display.

In an embodiment, each game event involves the symbols forming part of a winning combination.

In an embodiment, all the sounds are output together when all of the symbols form a winning combination.

In an embodiment, each speaker is a speaker of a gaming device.

In an embodiment, the gaming system comprises a plurality of gaming devices and a plurality of sound controllers associated with respective ones of a plurality of gaming devices.

In an embodiment, the gaming system comprises a plurality of speakers associated with respective ones of the plurality of gaming devices and under the control of the same sound controller.

In an embodiment, the game event is a win in at least one of the games.

In a third aspect, the invention provides a sound controller arranged to control at least one speaker associated with at least one gaming device to output a plurality of different game accompanying sounds individually during at least part of play of one or more games and to output two or more of the sounds together in response to at least one game event occurring.

In an embodiment, the sound controller is arranged to control a plurality speakers associated with respective ones of a plurality of gaming devices, and wherein the sound controller is arranged to control the sound output such that different game accompanying sounds are output by speakers of respective ones of gaming devices, and the sounds are all output together as a composite output sound by speakers of at least one of the gaming devices in response to the at least one game event occurring.

In an embodiment, the sound controller controls the sound output such that the composite output sound is output by the at least one speaker associated with each gaming device associated with the game event.

In an embodiment, the sound controller controls the sound output so that the composite output sound is output by the speakers associated with one gaming device.

In an embodiment, the individual sounds are associated with respective ones of a plurality of game events which can occur on at least one gaming device and the sound controller is arranged to control the at least one speaker to output a composite sound formed from sounds associated with game events which occur together.

In an embodiment, the game event is a win in at least one of the games.

In a fourth aspect, the invention provides a gaming system comprising:

a plurality of gaming devices each associated with at least one speaker; and a sound controller arranged to control the sound output with the speakers such that sound is perceived as moving from at least one of the gaming devices to at least another of the gaming devices.

In an embodiment, the sound controller is arranged to control the output such that sound is perceived to stop at a winning gaming device.

In an embodiment, each speaker is a speaker of a gaming device.

In a fifth aspect, the invention provides a sound controller for a gaming system comprising a plurality of gaming devices each associated with at least one speaker, the sound controller arranged to control the sound output with the speakers such that sound is perceived as moving from at least one of the gaming devices to at least another of the gaming devices.

In an embodiment, the sound controller is arranged to control the output such that sound is perceived to stop at a winning gaming device.

In an embodiment, the sound output to indicate a possible game event.

In a sixth aspect, the invention provides a method of gaming comprising controlling the sound output from speakers associated with respective ones of a plurality of gaming devices such that sound is perceived as moving from at least one of the gaming devices to at least another of the gaming devices.

In an embodiment, the method comprises controlling the sound output such that sound is perceived to stop at a winning gaming device.

In an embodiment, the method comprises controlling the sound output to indicate a possible game event.

In a seventh aspect, the invention provides a method of gaming comprising:

outputting at least one suspense sound with at least one speaker associated with at least one gaming device in response to occurrence of at least one precursor event, the suspense sound indicative of a possible game event at least one gaming device and being output at least prior to the game event occurring when the game event does occur.

In an embodiment, the method comprises outputting a game event indicating sound in response to the game event occurring.

In an embodiment, the game event indicating sound is related to the suspense sound.

In an embodiment, the method comprises continuing to output the suspense sound if the game event occurs.

In an embodiment, the method is conducted in respect of a single gaming device, wherein the precursor event comprises the occurrence of a part of a designated combination of symbols on the gaming device and the game event comprises the completion of the designated symbol combination.

In an embodiment, the method is conducted in respect of a plurality of gaming devices, wherein the precursor event comprises the occurrence of a designated symbol or a designated combination of symbols on at least one gaming device and the game event comprises the occurrence of the designated symbol or designated combination of symbols on at least one other gaming device.

In an eighth aspect, the invention provides a gaming system comprising:

at least one gaming device associated with at least one speaker; and a sound controller arranged to control the at least one speaker to output at least one suspense sound in response to occurrence of at least one precursor event, the suspense sound indicative of a possible game event at least one gaming device and being output at least prior to the game event occurring when the game event does occur.

In an embodiment, the sound controller is arranged to control at least one speaker to output a game event indicating sound in response to the game event occurring.

In an embodiment, the game event indicating sound is related to the suspense sound.

In an embodiment, the gaming system is arranged to continue to output the suspense sound if the game event occurs.

In an embodiment, the gaming system comprises a single gaming device, and wherein the precursor event comprises the occurrence of a part of a designated combination of symbols on the gaming device and the game event comprises the completion of the designated symbol combination.

In an embodiment, the gaming system comprises a plurality of gaming devices, wherein the precursor event comprises the occurrence of a designated symbol or a designated combination of symbols on at least one gaming device and the game event comprises the occurrence of the designated symbol or designated combination of symbols on at least one other gaming device.

In a ninth aspect, the invention provides a sound controller for a gaming system comprising at least one gaming device associated with at least one speaker, the sound controller arranged to control the at least one speaker to output at least one suspense sound in response to occurrence of at least one precursor event, the suspense sound indicative of a possible game event at least one gaming device and being output at least prior to the game event occurring when the game event does occur.

In an embodiment, the sound controller is arranged to control at least one speaker to output a game event indicating sound in response to the game event occurring.

In an embodiment, the game event indicating sound is related to the suspense sound.

In an embodiment, the sound controller is arranged to cause the continued output of the suspense sound if the game event occurs.

In a tenth aspect, the invention provides computer program code which when executed implements the one or more of the above methods.

In an eleventh aspect, the invention provides a computer readable medium comprising the above program code.

In a twelfth aspect, the invention provides a data signal comprising the above program code.

In a thirteenth aspect, the invention extends to transmitting the above program code.

BRIEF DESCRIPTION OF DRAWINGS

An exemplary embodiment of the invention will be described in relation to the accompanying drawings in which.

DETAILED DESCRIPTION

Figure 1:
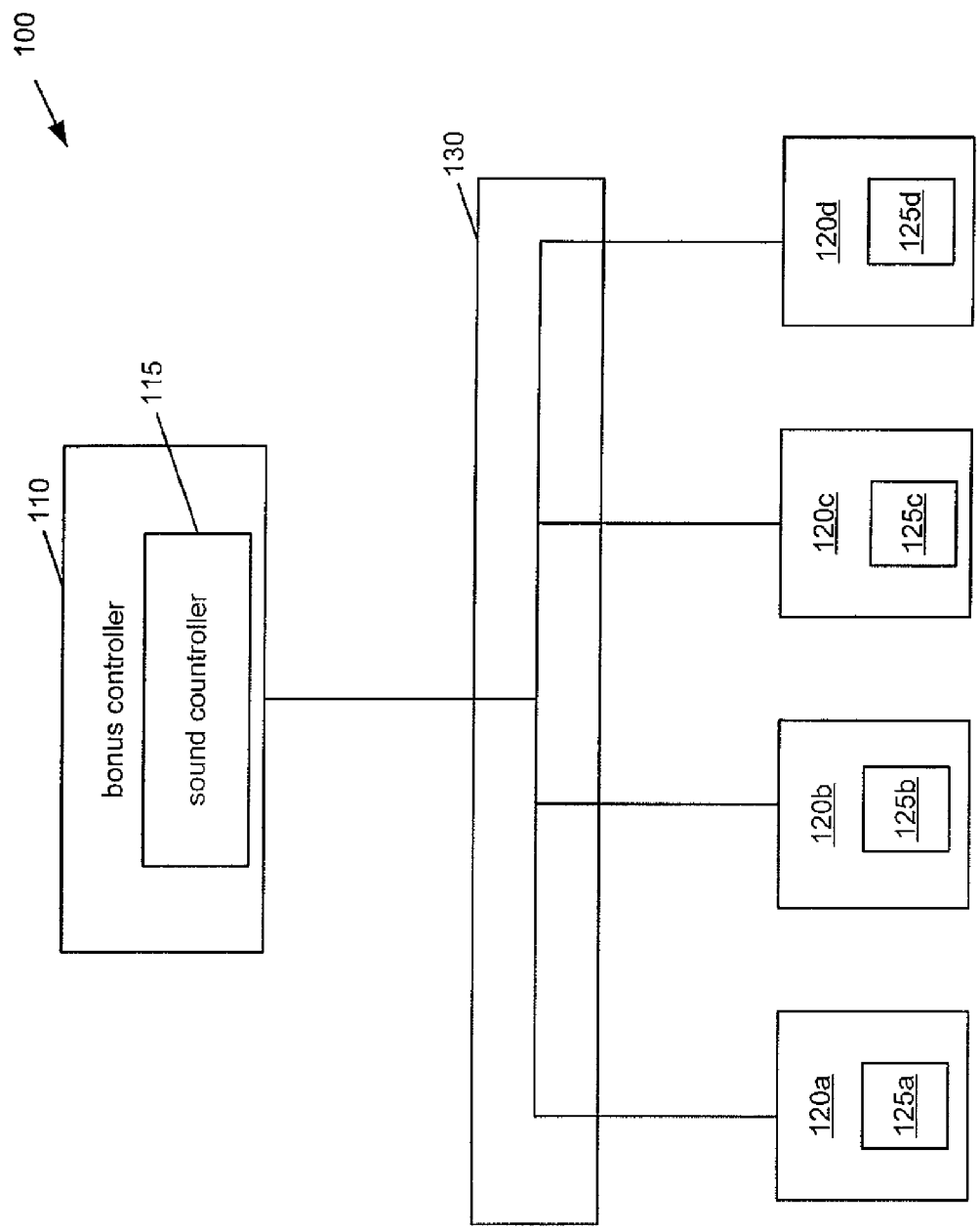
FIG. 1 is a block diagram of a gaming system.

Referring to the drawings, there is shown a gaming system with a sound controller.

General System Configuration

Depending on the embodiment, the gaming system may take a number of different forms. In one form, shown in FIG. 1, the gaming system 100, includes a bonus controller 110 having a sound controller 115. The bonus controller 110 is in data communication with a plurality of gaming devices 120 over a network 130. In FIG. 1, each gaming device has a speaker 125 which can be controller by the sound controller. In an alternative embodiment, the speakers may be provided independently of the gaming devices but in close proximity so that they are associated with respective gaming devices. A person skilled in the art will also appreciate that other configurations may be viable.

In another form, the function of the sound controller may be distributed in function across a plurality of gaming devices, for example, by having sub-controller modules in each gaming device which are arranged to communicate with one another.

Figure 5:
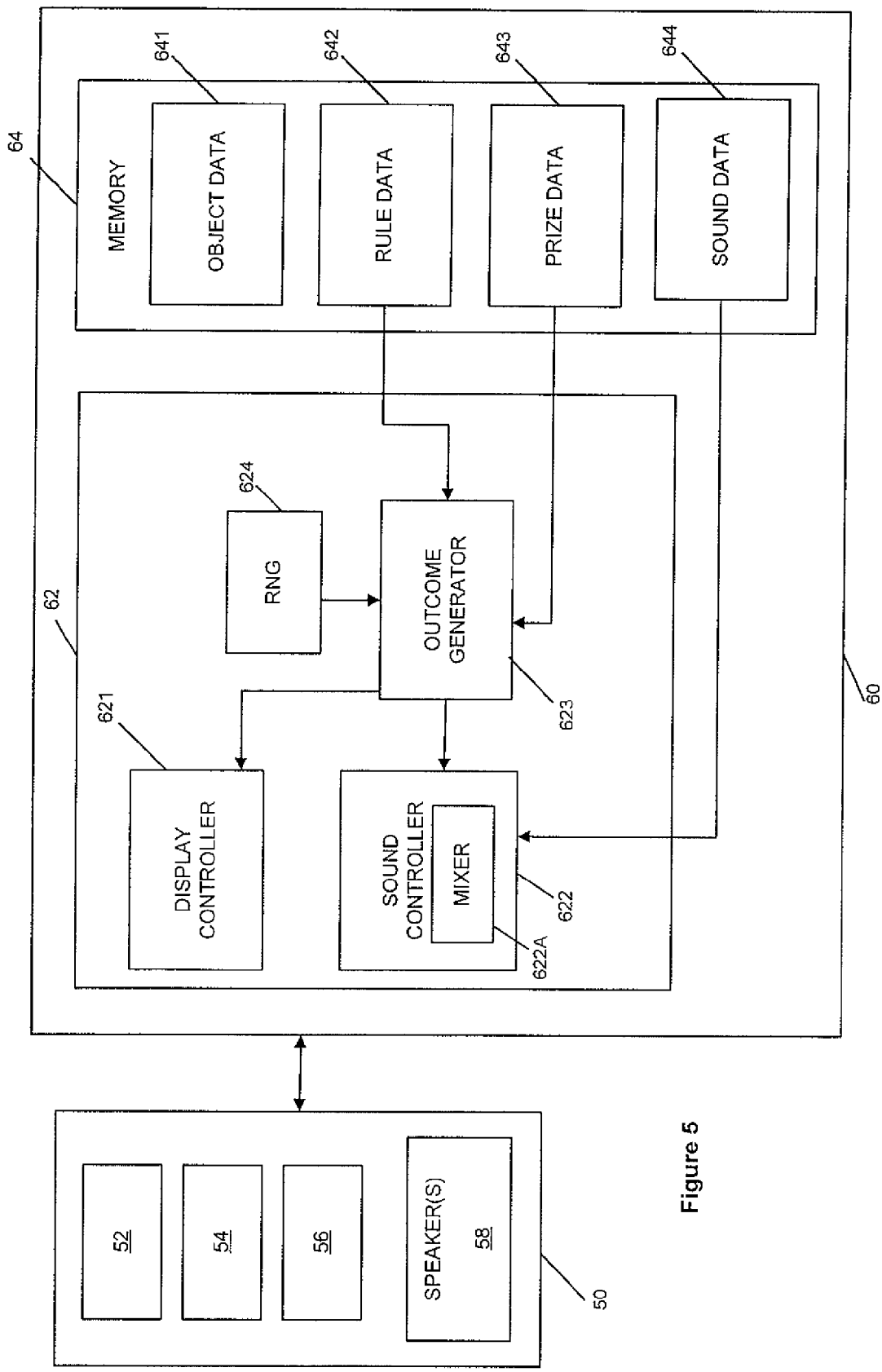
FIG. 5 is a block diagram of a further gaming system.

In another form, the gaming system is provided by a single gaming device and a sound controller. In this form, the sound controller is typically part of the gaming device. Such a gaming system is illustrated in FIG. 5 and will be described in more detail below.

Gaming Devices

Herein, the term gaming device is used to refer to any device used by a player to play a game and specifically includes stand alone gaming machines and interactive video terminals which implement games in a client/server architecture.

Figure 2:
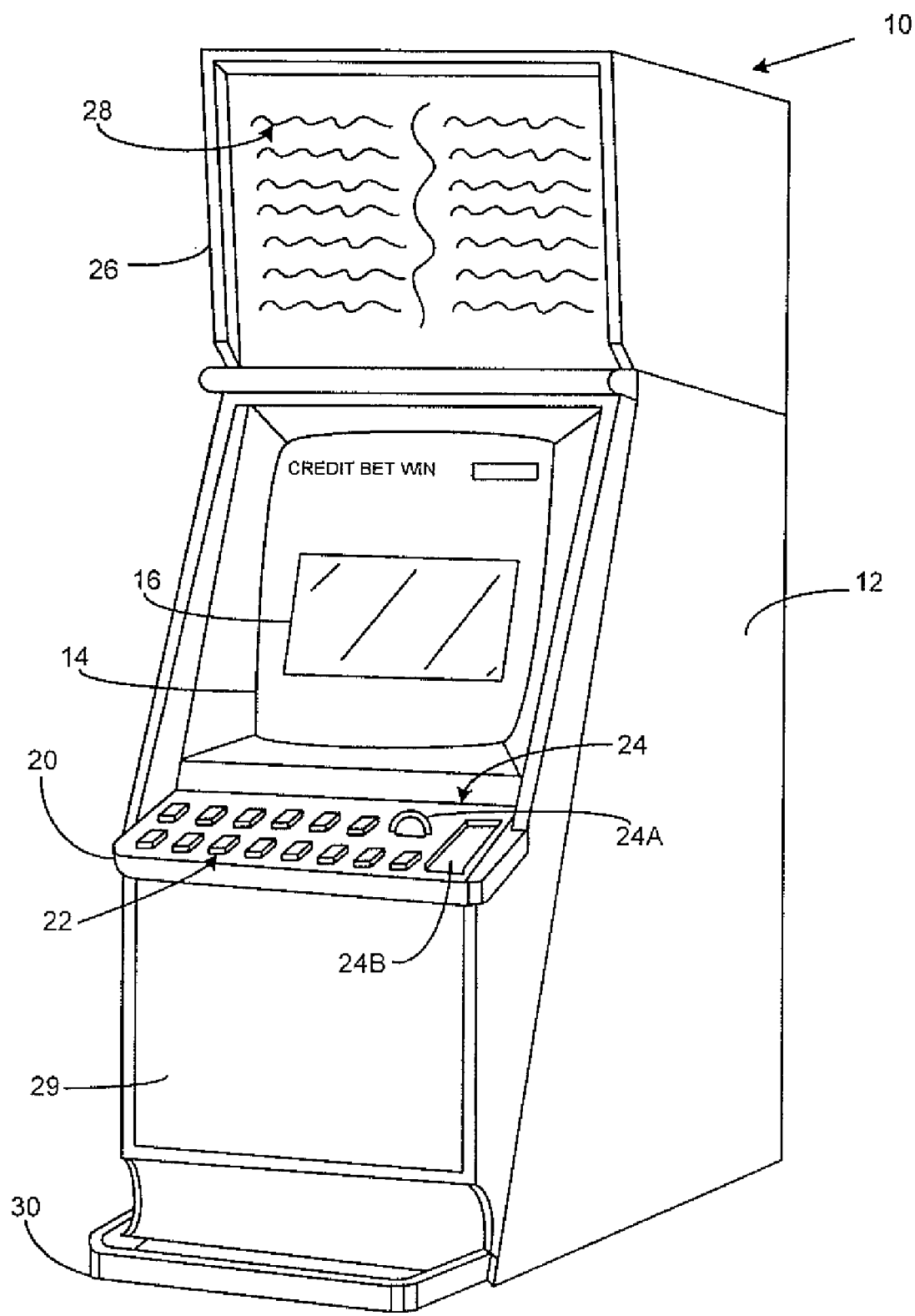
FIG. 2 is a perspective view of a gaming device in the form of a stand alone gaming machine.

A gaming device in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module comprising a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
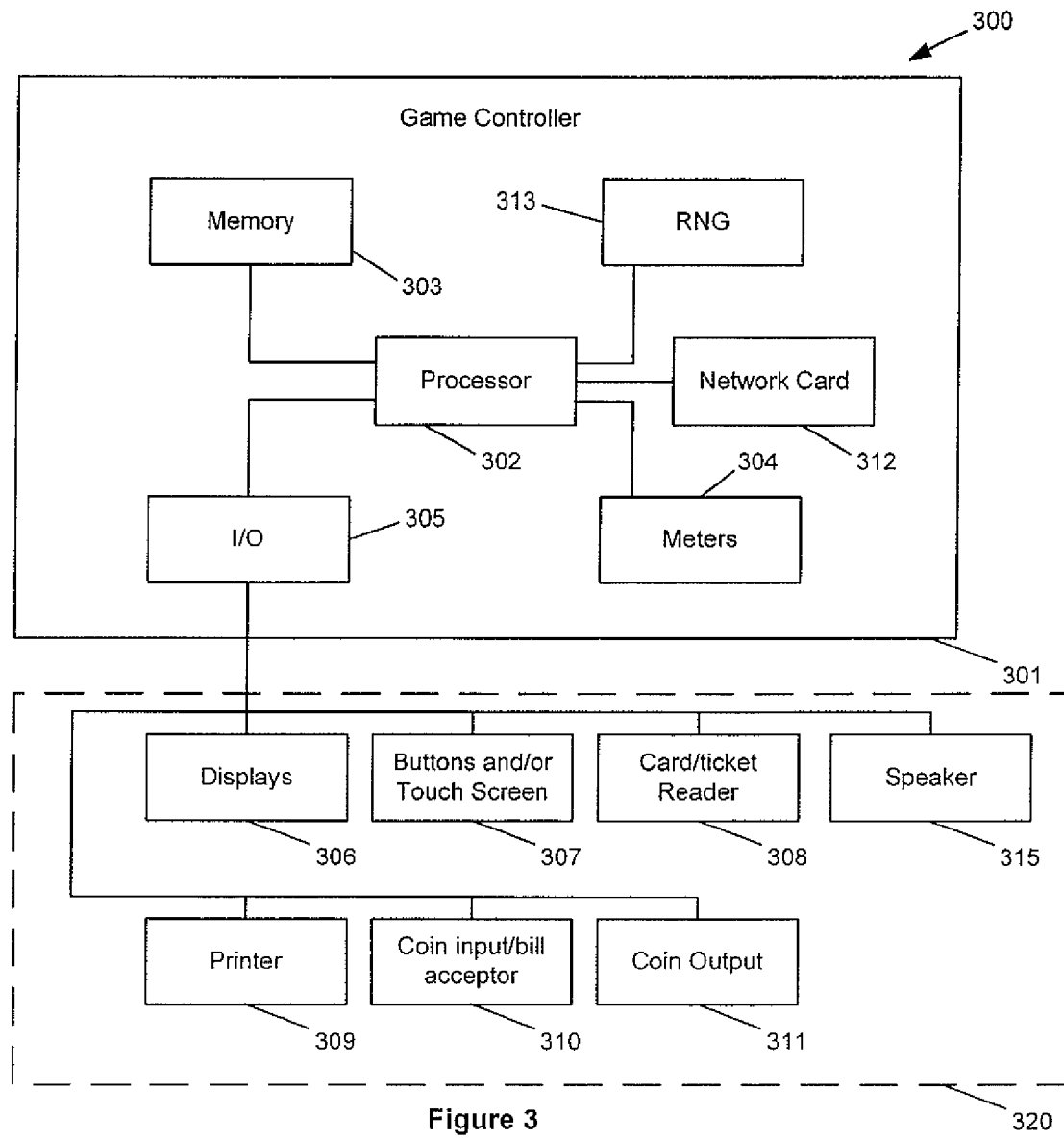
FIG. 3 is a block diagram of the functional components of a gaming machine.

FIG. 3 shows a block diagram of operative components of a typical gaming machine 300 which may be the same as or different to the gaming machine of FIG. 2.

The gaming machine 300 includes a game controller 301 having a processor 302. Instructions and data to control operation of the processor 302 are stored in a memory 303, which is in data communication with the processor 302. Typically, the gaming machine 300 will include both volatile and non-volatile memory and more than one of each type of memory, with such memories being collectively represented by the memory 303.

The gaming machine 300 has hardware meters 304 for purposes including ensuring regulatory compliance and monitoring player credit, an input/output (I/O) interface 305 for communicating with peripheral devices of the gaming machine 300. The input/output interface 305 and/or the peripheral devices may be intelligent devices with their own memory for storing associated instructions and data for use with the input/output interface or the peripheral devices. A random number generator module 313 generates random numbers for use by the processor 302. Persons skilled in the art will appreciate that the reference to random numbers includes pseudo-random numbers.

In the example shown in FIG. 3, a player interface 320 includes peripheral devices that communicate with the game controller 301 comprise one or more displays 306, buttons and/or a touch screen 307, a card and/or ticket reader 308, a printer 309, a bill acceptor and/or coin input mechanism 310, a coin output mechanism 311 and at least one speaker 315. Additional hardware may be included as part of the gaming machine 300, or hardware may be omitted as required for the specific implementation.

In addition, the gaming machine 300 may include a communications interface, for example a network card 312. The network card may, for example, send status information, accounting information or other information to a central controller, server or database and receive data or commands from the central controller, server or database.

Figure 4:
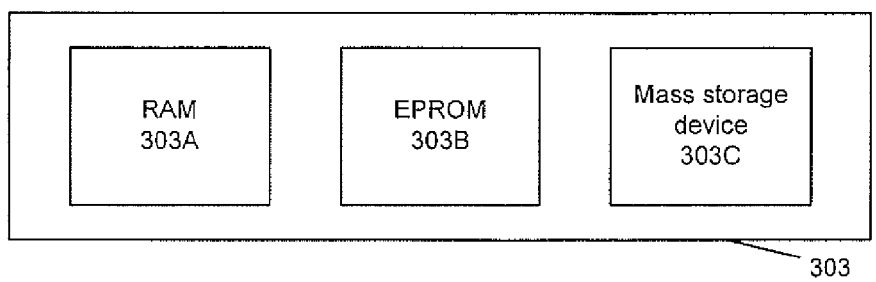
FIG. 4 is a schematic diagram of the functional components of a memory.

FIG. 4 shows a block diagram of the main components of an exemplary memory 303. The memory 303 includes RAM 303A, EPROM 303B and a mass storage device 303C. The RAM 303A typically temporarily holds program files for execution by the processor 302 and related data. The EPROM 303B may be a boot ROM device and/or may contain some system or game related code. The mass storage device 303C is typically used to store game programs, the integrity of which may be verified and/or authenticated by the processor 302 using protected code from the EPROM 303B or elsewhere.

It is also possible for the operative components of the gaming machine 300 to be distributed, for example input/output devices 306,307,308,309,310,311 to be provided remotely from the game controller 301.

A gaming device as indicated above may also take the form of a client/server architecture where a portion of the game is executed on the client and a portion of the game is executed on the server. In such embodiments, the client typically takes the form of an interactive video terminal which has a similar outward appearance to the gaming machine described above but the terminal is only responsible for limited functions, for example rendering graphically game outcomes generated by a server.

Sound Controller

Sound controllers of embodiments to the invention are generally arranged such that individual sounds are output as part of play of one or more games but in response to a game event, such as a win event, two or more of the sounds are output together. In one example, sounds are output together in relation to a specific win event.

Producing sounds from a plurality of individual sounds can be done either in relation to the gaming system of FIG. 1 or a gaming system as represented by the gaming device of FIG. 5. In gaming systems such as that shown in FIG. 1, the sound controller 115 can also be arranged to produce moving sound effects which travel relative to the individual gaming machines 120. Such a sound can be caused to stop at one of the gaming machines when there is a win event.

Referring to FIG. 1, it will be seen that the speakers 125 form part of respective ones of the plurality of gaming machines 120A to 120D. As described above, the speakers 125 can also be provided independently of a gaming machine.

It will be appreciated that where the speakers 125 form part of the gaming machines, the gaming machines are arranged to interpret signals received from the sound controller 115 in order to output appropriate sound on the speaker 125 (for example, the processor of the gaming controller of the gaming machine may be arranged to receive sound data output by the sound controller and control the speaker 125 to output sound based on the sound data). The machines 120 will also communicate data to the bonus controller 110 to enable it to take actions.

In one example employing a system configuration as show in FIG. 1, the sound controller 115 forms part of a bonus controller 110 arranged such that a group of machines can be controlled by the bonus controller 110 to give a prize to everyone playing the machines 120A to 120D. In an example, each of the gaming machine devices 120A to 120D corresponds to a different sound. For example, one device represents a singer, one represents a trumpet, one represents a double bass and one represents the drums. Each of the gaming machines when played individually has a game where the sound effects are related to the instrument/singer associated with them. When the bonus controller 110 determines that a game event has occurred such that a bonus prize is to be awarded to each of the gaming machines 120, the sound controller 115 controls each of the speakers 125 to play the same tune with all the sounds from the signer, trumpet, bass and drums to thereby indicate that a win has been awarded to each gaming machine.

In an analogous manner, if an individual gaming machine, say gaming machine 120B wins a prize, the bonus controller 110 or an analogous controller such as jackpot controller could employ the sound controller 115 to cause that single machine 120B to output a composite sound formed from a plurality of related sounds of the other gaming machines such that a win will be apparent to the other players. A person skilled in the art will appreciate that variations can occur, for example where for lesser wins only two or more sounds are combined.

In addition to the above, the gaming system of FIG. 1 can achieve other effects. For example, in the case above where a win is awarded to just one of the machines a sound can be controlled so that it appears to be moving between the gaming machines. For example, it can be first output at speaker 125A, then at 125B, then at 125C and then at 125D before being output at 125A again. The sound can continue to circle between the speakers 125A to 125D until stopping at one of the gaming machines to indicate a win. For example, the sound could be in the form of a drum roll moving from gaming machine to gaming machine followed by an announcement "And the winner is . . . ".

In an alternative embodiment, different sounds are allocated to different game events which may occur together. In one example, in a spinning reel type game, different sounds are allocated to symbols which correspond to five different instruments which may appear on one of five different reels on a display of a gaming machine.

One winning combination is formed by each of the symbols appearing together in a winning combination of symbols. In this example, all instruments will be played together so as to play a composite win sound when this winning combination occurs. The sounds of individual instruments may be played when they appear individually or if they appear in another winning combination.

FIG. 5 shows a block diagram of a gaming system arranged to implement such an embodiment. In this embodiment the outcome generator 623 of game controller (implemented by processor 62 executing program code stored in memory 64) is arranged to select symbols using random number generator 624 from at least one set of symbols specified by symbol data 641 stored in memory 64 for display on the display 54 of a player interface 50 of a gaming device. In one embodiment, the symbols may correspond to a plurality of reel strips for a spinning reel type game and the outcome generator of the game controller selects the symbols in one of the known manners for spinning reel type games. For example, by selected stop positions for each reel. If the outcome generator 623 determines that these symbol combinations correspond to winning combinations, it will award prizes based on prize data 643. In addition, the outcome generator advises a sound controller 622 which of the symbols associated with sounds of appeared in the generated outcome. The sound controller 622 then causes the speaker(s) 58 to output sounds corresponding to the symbols which appear based on sound data 644. If a composite sound is to be output, for example if two or more symbols appear together in a winning combination, the sound controller 622 uses mixer 622A to combine the sounds together. A person skilled in the art will appreciate that other sound embodiments, a mixer 622A may not be necessary as the sound data 644 may include all the available combinations of musical instruments. Sound controller 622 outputs the composite sound on the speakers 58. In one example, a win combination corresponds to the appearance of five different musical instruments on a win line on the display 54. In this example the sound controller 622 outputs a winning sound corresponding to the sound of a band formed by all of the musical instruments.

A person skilled in the art will appreciate that other embodiments are possible. For example, the instruments may only play a tune individually when forming part of a winning combination. Further a pay table can be constructed so that there is less of a pay for few instruments and more for the entire band.

The sounds need not be the sounds of instruments, for example they could be the sounds of animals, vehicles or the like: whatever suits the theme of the game. In another example, a moving sound type game could have a musical chairs type theme such that players know that when the music stops they receive a win. These and other embodiments will be apparent to a person skilled in the art.

In further embodiments the sounds can, instead or in addition be used to provide an element of "suspense" that is to indicate that a event could possibly occur. In these embodiments a suspense sound indicative of the possible game event is output when a precursor event occurs. The game event may be, for example, triggering of a feature game or occurrence of a high value symbol combination.

A precursor event may be, for example, that a part of a symbol combination has appeared on the reels of a spinning reel type game. For example, in a stand alone embodiment employing a gaming system of the type illustrated in FIG. 5 the appearance of two car symbols on the reels triggers a feature game in the form of a series of free games. When the reels are spun a car engine sound may be output under control of sound controller 622. When a first car symbol appears on the reels a braking sound is output by the sound controller 622: i.e. the first car symbol is the precursor event and the braking sound is the suspense sound. If a second car symbol appears the sound controller 622 outputs a crash sound to indicate that the feature will be triggered—i.e. that the game event has occurred. If the second car symbol does not appear, or can no longer appear, e.g. because it can only appear on a specific reel and that reel has stopped, the suspense sound is turned off.

In an embodiment, employing the arrangement of FIG. 1, a bonus controller 110 may make an award to the player's of each of gaming machines if a bonus symbol is spun up on the reels of each of the respective machines within a designated time period. In one example, a suspense sound is output from each of speakers 125 once two or three of the gaming machines 120 have spun up a bonus symbol. The suspense sound could be a composite sound formed of the sounds of individual machines as described above. The sound becomes the winning sound if the fourth machine spins up the bonus symbol in the required time period. In this example, the suspense and winning sounds may be the same.

Persons skilled in the art will appreciate that other gaming systems are possible. For example in a system having a plurality of gaming devices as shown in FIG. 1, each gaming machine may have a sound controller as shown in FIG. 5 which operates based on data indicating the state of the game received from bonus controller, such that it is not necessary for there to be a single controlling sound controller—i.e. the individual sound controllers act collectively to achieve the desired outcome.

persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by downloading it from a server). Such program code can be executed by one or more processors to implement the sound controllers/gaming systems described above.

It will be understood to persons skilled in the art of the invention that many modifications may be made without departing from the spirit and scope of the invention. In particular, persons skilled in the art will appreciate that features of the above embodiments and examples can be combined to form further embodiments.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The claims defining the invention are as follows:

1. A method of gaming for use with a gaming system having a plurality of gaming devices each having at least one speaker, each of the plurality of gaming devices corresponding to a different sound, and wherein each of the gaming devices is configured to play at least one game in which sound effects are associated with the respective sound, the method comprising:
   determining if at least one game event has occurred such that one or more prizes is to be awarded to respective ones of the plurality of gaming devices; and
   controlling the at least one speaker of each gaming device that is to be awarded a prize to output respective corresponding sounds thereby forming a composite sound in response to the at least one game event occurring, the composite sound indicative of the gaming devices that are to be awarded the one or more prizes.

2. A method as claimed in claim 1, and wherein the composite output sound is output by one gaming device.

3. A method as claimed in claim 1, wherein the individual sounds are associated with respective ones of a plurality of game events which can occur on at least one gaming device.

4. A method as claimed in claim 3, and further comprising outputting a composite sound formed from sounds associated with game events which occur together.

5. A method as claimed in claim 3, wherein individual sounds are associated with respective ones of a plurality of symbols and each game event involves the symbols being displayed on a display.

6. A method as claimed in claim 4, wherein each game event involves the symbols forming part of a winning combination.

7. A method as claimed in claim 5, wherein all the sounds are output together when all of the symbols form a winning combination.

8. A method as claimed in claim 1, wherein the game event is a win in at least one of the games.

9. A gaming system comprising:
   a plurality of gaming devices each having at least one speaker, each of the plurality of gaming devices corresponding to a different sound, and wherein each of the gaming devices is configured to play at least one game in which sound effects are associated with the respective corresponding sound;
   at least one bonus controller for determining that at least one game event has occurred such that one or more prizes is to be awarded to respective ones of the plurality of gaming devices; and
   at least one sound controller arranged to control the at least one speaker of each gaming device that is to be awarded a prize to output their respective corresponding sounds thereby to form a composite sound in response to the at least one game event occurring, the composite sound indicative of the gaming devices that are to be awarded the one or more prizes.

10. A gaming system as claimed in claim 9, and wherein the sound controller controls the sound output such that the composite output sound is output by the at least one speaker associated with each gaming device associated with the game event.

11. A gaming system as claimed in claim 9, and wherein the sound controller controls the sound output so that the composite output sound is output by the speakers associated with one gaming device.

12. A gaming system as claimed in claim 9, wherein the individual sounds are associated with respective ones of a plurality of game events which can occur on at least one gaming device.

13. A gaming system as claimed in claim 12, wherein the sound controller is arranged to control the at least one speaker to output a composite sound formed from sounds associated with game events which occur together.

14. A gaming system as claimed in claim 12, wherein individual sounds are associated with respective ones of a plurality of symbols and each game event involves the symbols being displayed on a display.

15. A gaming system as claimed in claim 14, wherein each game event involves the symbols forming part of a winning combination.

16. A gaming system as claimed in claim 14, wherein all the sounds are output together when all of the symbols form a winning combination.

17. A gaming system as claimed in claim 9, wherein the game event is a win in at least one of the games.

18. A sound controller for use with a gaming system having a plurality of gaming devices each having at least one speaker, each of the plurality of gaming devices corresponding to a different sound, and wherein each of the gaming devices is configured to play at least one game in which sound effects are associated with the respective sound, the controller is arranged to determine if at least one game event has occurred such that one or more prizes is to be awarded to respective ones of the plurality of gaming devices; and to control the at least one speaker of each gaming device that is to be awarded a prize to output respective corresponding sounds thereby to form a composite sound in response to the at least one game event occurring, the composite sound indicative of the gaming devices that are to be awarded the one or more prizes.

19. A sound controller as claimed in claim 18, and wherein the sound controller controls the sound output such that the composite output sound is output by the at least one speaker associated with each gaming device associated with the game event.

20. A sound controller as claimed in claim 18, and wherein the sound controller controls the sound output so that the composite output sound is output by the at least one speaker associated with one gaming device.

21. A sound controller as claimed in claim 18, and wherein the individual sounds are associated with respective ones of a plurality of game events which can occur on at least one gaming device and the sound controller is arranged to control the at least one speaker to output a composite sound formed from sounds associated with game events which occur together.

22. A sound controller as claimed in claim 18, and wherein the game event is a win in at least one of the games.

* * * * *